Figure 1:
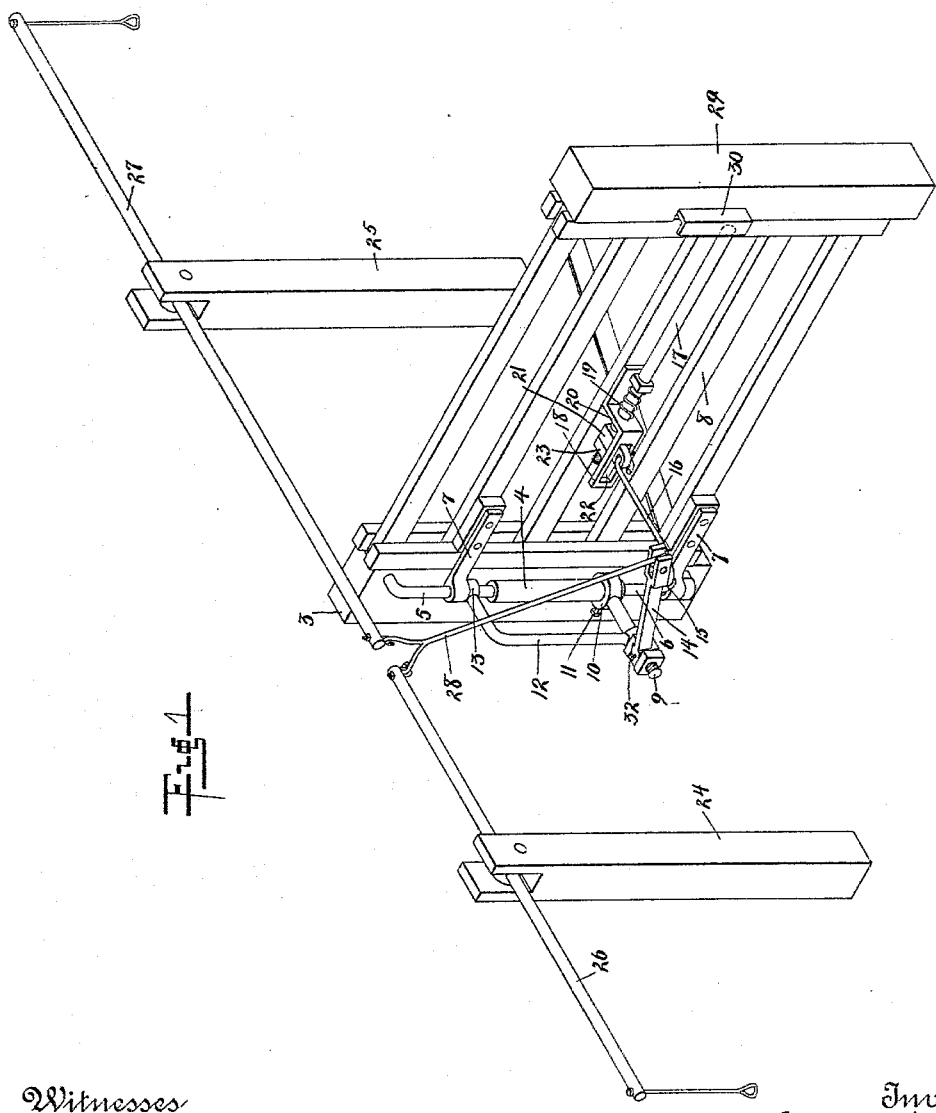

(No Model.) 2 Sheets—Sheet 1.

H. W. RAGSDALE.
DRIVE GATE.

No. 562,912. Patented June 30, 1896.

Witnesses
Carl Kreis
V. Elbert

Inventor
Harvey W. Ragsdale

By Attorneys
H. P. Hood & Son (No Model.)  2 Sheets—Sheet 2.
H. W. RAGSDALE.
DRIVE GATE.
No. 562,912. Patented June 30, 1896.
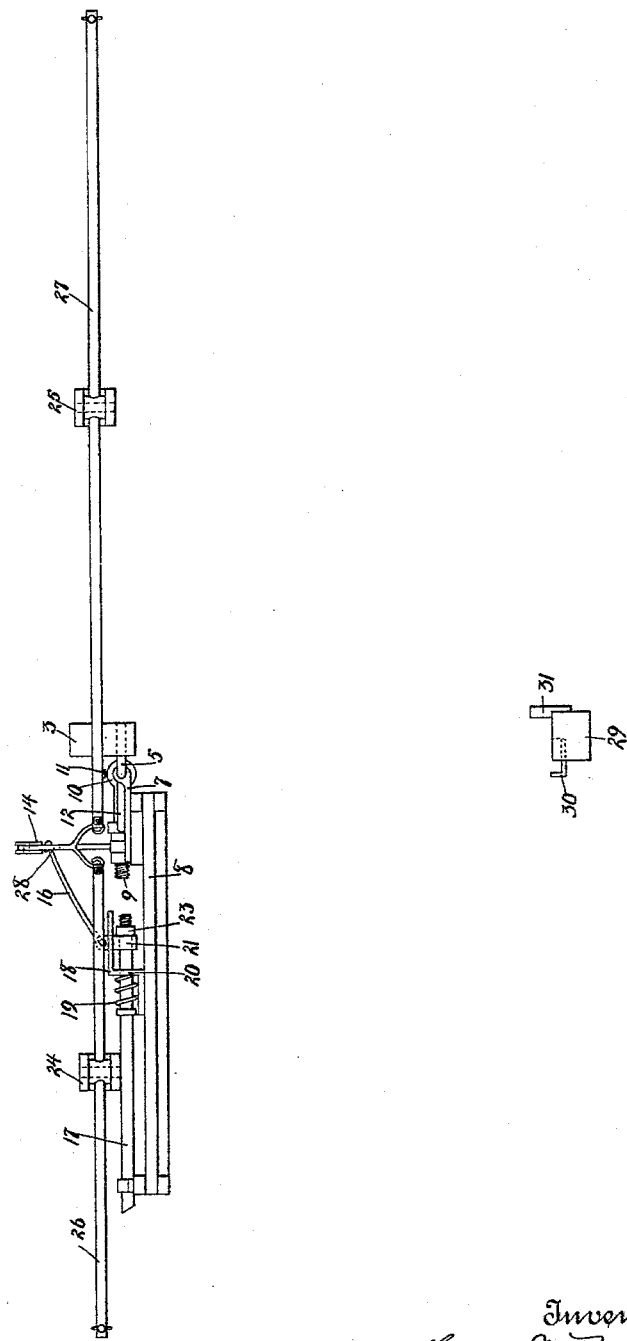
Witnesses
Carl Kreis
W. Elbert
Inventor
Harvey W. Ragsdale
By Attorneys
H. P. Hood & Son

UNITED STATES PATENT OFFICE.

HARVEY W. RAGSDALE, OF TRAFALGAR, INDIANA.

DRIVE-GATE.

SPECIFICATION forming part of Letters Patent No. 562,912, dated June 30, 1896.

Application filed February 12, 1896. Serial No. 579,022. (No model.)

*To all whom it may concern:*

Be it known that I, HARVEY W. RAGSDALE, a citizen of the United States, residing at Trafalgar, in the county of Johnson and State of Indiana, have invented a new and useful Drive-Gate, of which the following is a specification.

My invention relates to an improvement in drive-gates.

The object of my invention is to produce a gate of the class mentioned, which may be easily operated, which may be vertically adjusted, and which cannot be pushed open by stock.

The accompanying drawings illustrate my invention.

Figure 1 is a view in perspective showing the gate closed. Fig. 2 is a plan showing the gate open.

In the drawings, 3 indicates a post, to one face of which is secured the vertical hinge-bar 4. The ends 5 and 6 of bar 4 are made smaller than the central portion thereof, and mounted upon each of said ends, so as to rotate and to be vertically adjustable thereon, is a hinge-strap 7, the free ends of said straps being secured to gate 8. A short shaft 9 is provided at one end with an eye 10, which embraces the middle portion of hinge-bar 4, and is made vertically adjustable thereon by means of a set-screw 11, the arrangement being such that the shaft is rigidly secured to the hinge-bar, so as to project at substantially a right angle to the plane of the gate when closed. A brace 12 is secured at one end to shaft 9, and at its other end is provided with an eye 13, which embraces the upper part 5 of bar 4, and is vertically movable thereon, the said eye being placed directly below the upper strap 7 and thereby supporting the gate.

Pivoted upon shaft 9, so as to swing in a plane substantially parallel to the gate when closed, is an arm 14, bifurcated at its outer end, and carrying near the said outer end an eye 15, through which is passed one end of a link 16, the opposite end of said link being attached to a sliding latch-bar 17, mounted so as to slide longitudinally in a bracket 18, which is secured to the face of the gate. Latch-bar 17 is held normally outward by means of a spiral spring 19, mounted thereon and engaging shoulder 20 of bracket 18. Link 16 is connected with the latch-bar by means of a block 21, mounted on the bar and projecting through a slot 22 in bracket 18. Block 21 is adjustably secured on the latch-bar, so as to limit the movement thereof, by a check-nut 23. Arranged along the roadway, on opposite sides of the gate, are a pair of posts 24 and 25, to which are pivoted a pair of operating-levers 26 and 27. The inner ends of said levers are connected with the bifurcated end of arm 14 by means of a connecting-rod 28.

A gate-post 29, provided with stops 30 and 31, secured to opposite faces of the post, engages the free edge of the gate.

The operation of my device is as follows: The gate being closed, as in Fig. 1, is held in position by the latch-bar 17, which engages stop 30. The outer end of either of the operating-levers being depressed, the free end of arm 14 is raised, the first effect of its movement being to withdraw the latch-bar 17, by means of link 16, from engagement with stop 30. A further movement of the arm draws the gate open; the pull upon the operating-lever continuing only until the arm has reached the perpendicular, when the said lever is released and the arm continues its movement in the same direction until the gate has reached the position shown in Fig. 2. The gate is closed by a similar movement of either one of the operating-levers swinging arm 14 in the opposite direction.

It will be observed that the path of movement of arm 14, and the manner of connecting said arm with the gate by means of link 16, operates to hold the gate either in its closed or in its open position irrespective of the operation of the latch-bar, so that, in case the said latch-bar becomes inoperative or fails to engage stop 30, the gate is still held against the pushing of stock or the effects of the wind.

The eye 10 of shaft 9 and eye 13 of brace 12 may be vertically adjusted upon bar 4, thereby raising or lowering gate 8, so that it may swing freely.

Arm 14 is provided with a set-screw 32, adapted to engage shaft 9, and thereby lock the gate in any desired position.

I claim as my invention—

1. In a gate of the class described, the combination with a pivoted gate, of an arm pivoted so as to swing in a plane substantially parallel to the plane of the gate when closed, a latch-bar mounted on said gate so as to move longitudinally thereon, a block longitudinally adjustable on the latch-bar, a link connecting said block with the free end of the pivoted arm and means for operating said arm, substantially as described.

2. In a gate of the class described, the combination with the hinge-bar, of a shaft secured thereto and vertically adjustable thereon, the gate pivotally mounted on said hinge-bar and vertically adjustable thereon, an arm pivoted on said shaft so as to swing in a plane substantially parallel to the gate when closed, a link connecting the gate and the free end of said arm, and means for operating said arm, substantially as set forth.

3. In a gate of the class described, the combination with the hinge-bar, a shaft secured thereto and vertically adjustable thereon, a brace secured at one end to the shaft and at the other end provided with an eye embracing the hinge-bar and vertically movable thereon, the gate pivotally mounted on said hinge-bar and supported in vertical adjustment by the brace, an arm pivoted on the shaft so as to swing in a plane substantially parallel to the plane of the gate when closed, a link connecting the gate with the free end of said pivoted arm, and means for operating said arm, substantially as described.

4. In a gate of the class described, the combination with the hinge-bar, a shaft secured thereto and vertically adjustable thereon, a brace secured at one end to the said shaft and at the other end provided with an eye embracing the hinge-bar and vertically movable thereon, the gate pivotally mounted on said hinge-bar and supported in vertical adjustment by the brace, an arm pivoted on the shaft so as to swing in a plane substantially parallel to the plane of the gate when closed, a link connecting the gate with the free end of the pivoted arm, the pivoted operating-levers, and the connecting-rod connecting one end of said levers with the free end of said arm, substantially as described.

5. In a gate of the class described, the combination with the hinge-bar, a shaft secured thereto and vertically adjustable thereon, a brace secured at one end to said shaft and at the other end provided with an eye embracing the hinge-bar and vertically movable thereon, the gate pivotally mounted on said hinge-bar and supported in vertical adjustment by the brace, an arm pivoted on the shaft so as to swing in a plane substantially parallel with the plane of the gate when closed, a latch-bar mounted on said gate so as to move longitudinally thereon, a link connecting the free end of the pivoted arm and a block longitudinally adjustable on the latch-bar, the pivoted operating-levers, and the connecting-rod connecting one end of the said levers with the free end of the pivoted arm, all combined and arranged to coöperate substantially as and for the purpose set forth.

HARVEY W. RAGSDALE.

Witnesses:
J. J. MOORE,
JASPER FORSYTH.